United States Patent [19]
Long et al.

[11] Patent Number: 5,947,539
[45] Date of Patent: Sep. 7, 1999

[54] APPARATUS AND METHOD HAVING SHORT LINEAR MOTION FOR GRASPING OBJECTS

[75] Inventors: Michael Long; Thomas W. Palone, both of Rochester; James A. White, Conesus, all of N.Y.

[73] Assignee: Eastman Kodak Company, Rochester, N.Y.

[21] Appl. No.: 08/865,796

[22] Filed: May 30, 1997

[51] Int. Cl.[6] ................................................ B25J 15/06
[52] U.S. Cl. .................. 294/119.1; 294/64.1; 294/902; 901/39
[58] Field of Search .................. 294/2, 64.1, 65, 294/86.4, 86.41, 88, 93, 97, 119.1, 902; 269/242; 279/33, 34, 110, 112; 318/568.21, 685; 901/31–39, 49

[56] References Cited

U.S. PATENT DOCUMENTS

| | | |
|---|---|---|
| 4,579,380 | 4/1986 | Zaremsky et al. ................... 294/119.1 |
| 4,598,942 | 7/1986 | Shum et al. . |
| 4,680,523 | 7/1987 | Goumas et al. . |
| 4,699,414 | 10/1987 | Jones . |
| 4,808,898 | 2/1989 | Pearson . |
| 4,955,653 | 9/1990 | Beals . |
| 5,050,919 | 9/1991 | Yakou ............................... 294/119.1 X |
| 5,215,507 | 6/1993 | Bonig . |
| 5,253,912 | 10/1993 | Andorlini et al. ................... 294/119.1 |
| 5,538,305 | 7/1996 | Conway et al. ..................... 294/119.1 |

*Primary Examiner*—Johnny D. Cherry
*Attorney, Agent, or Firm*—Clyde E. Bailey, Sr.

[57] ABSTRACT

An apparatus having short range motion for gripping and releasing an object utilizes a programmable stepper motor for controlling various short stroke motions of the gripper. Gears associated with each of the at least one gripper jaws supported on a carrier shaft engage a common ring gear that is driven by drive means including the stepper motor which imparts synchronous motion of the grippers for opening and closing about the object.

11 Claims, 5 Drawing Sheets

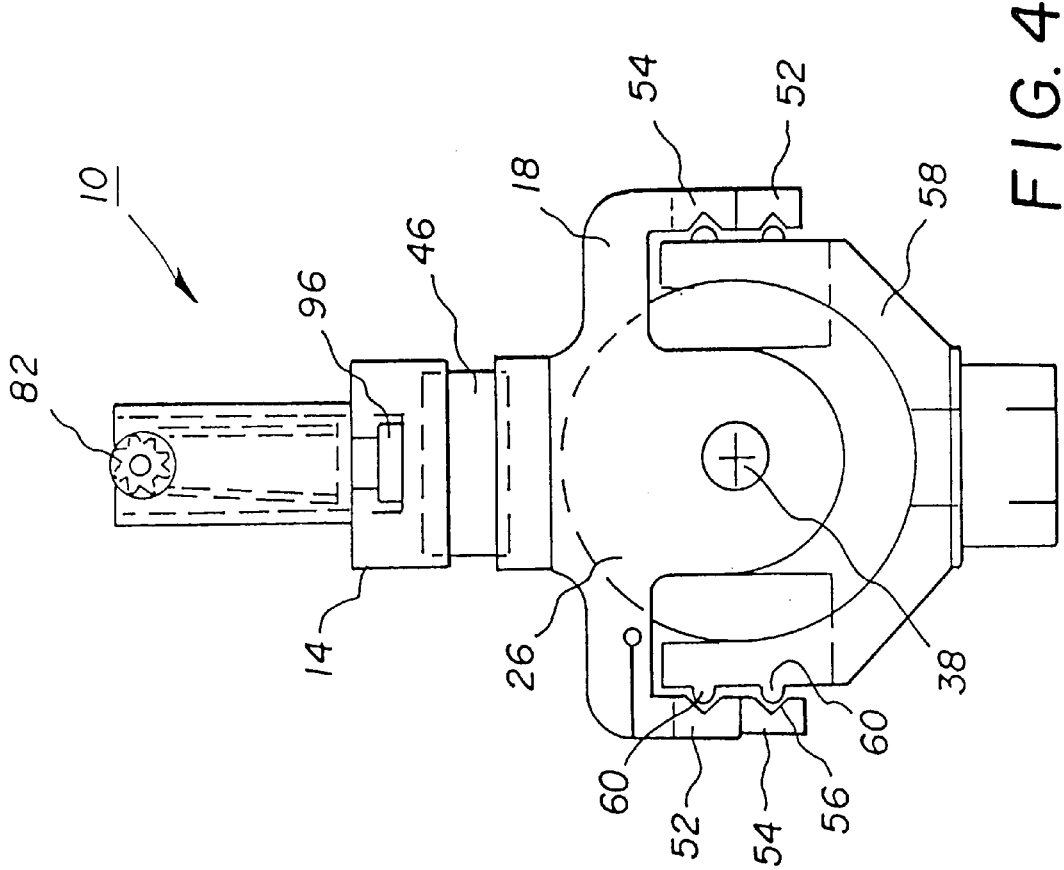
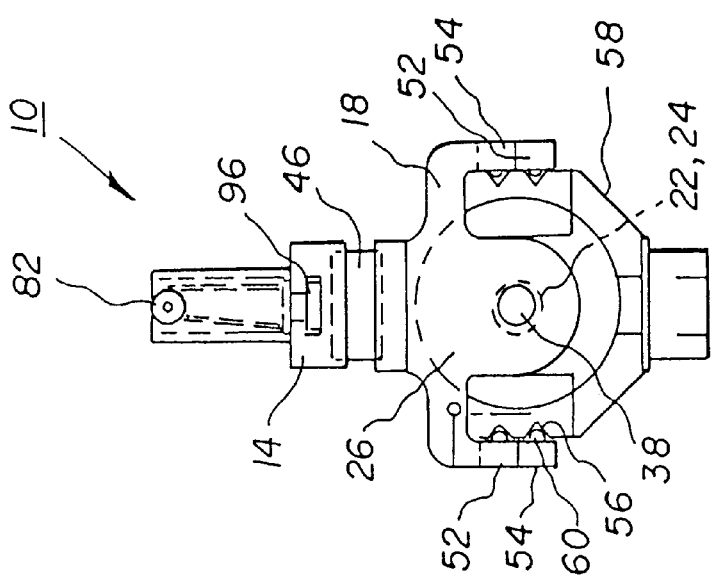

APPARATUS AND METHOD HAVING SHORT LINEAR MOTION FOR GRASPING OBJECTS

FIELD OF THE INVENTION

The invention relates generally to robotic grippers, more particularly, the invention concerns programmable means of providing short stroke grasping and releasing motion for apparatus for gripping objects.

BACKGROUND OF THE INVENTION

Commercially available robotic grippers fall into two general categories characterized by the motion of the gripping jaws. In one category, the gripping jaws move parallel to one another. In another, the gripping jaws move through an angular displacement.

Parallel motion jaws have two distinct advantages over angular motion jaws in that the gripping force vectors intersect inside of the envelope of the jaws for any part within their gripping range of motion and therefore produce no force vector tending to eject the part from the jaws and second, the action of opening and closing the jaws introduces no component of motion to the gripped part in a direction toward or away from the body of the gripper.

The disadvantages of linear translation, parallel jaw motion grippers are that they have more moving parts, weigh more and have a smaller range of jaw motion than angular motion jaw grippers.

Typically, parallel jaw motion grippers have a total range of jaw motion which is only 5 to 25 percent of the diameter of the gripper body, so unless a very large, massive gripper is used, frequent gripper changes are needed in assembly operations involving multiple, different size parts. The time required to change grippers, the positional inaccuracies in mounting different grippers on the robot arm and the variations in jaw centering from one gripper to another all detract from the performance of the assembly cell. Oversize grippers compromise the load carrying capacity and dynamic response of the robot by their increased weight. They also develop considerable clamping forces which are difficult to repeatably control when handling delicate plastic parts. Control is further compromised by piston seal stiction in the pneumatic actuators for these grippers.

Moreover, current torque limitation of small stepping motors limits the grasping force for a jaw to be between 1 and 2 pounds. This restricts their use to grasping objects weighing less than 20 oz. which includes the great majority of the parts in portable modern electronic consumer products.

Planetary gear grippers sold by Techno Sommer Automatic offer a large range of parallel jaw motion in a small size gripper by actuating the jaws through arcs of circles to simultaneously converge or diverge. These grippers overcome most of the mass and force control limitations of linear motion parallel jaw grippers but the inability to control the position of the jaws other than being fully open or fully closed introduces other limitations.

All of the commercially available grippers are actuated through simple pneumatic actuators which allow only fully open or fully closed jaw positions. With this limitation, large range of motion grippers are disadvantaged in gripping parts which are small relative to their maximum jaw opening in that cycle time is wasted in waiting for the jaws to close a large distance and when acquiring and releasing a part, are likely to interfere with adjacent parts. This will often prevent part acquisition or will damage parts which have already been placed in an assembly. Manually adjustable stops are available for some actuators, but it is more practical to change grippers than to adjust the gripper travel while it is installed on the robot. A second problem with pneumatically actuated, long stroke grippers is that high jaw velocities result when the gripper is optimized for cycle time. This results in high impact forces between the jaws and the part being acquired and can lead to object or part damage and missed parts when the part rebounds off of the jaw.

Additional flexibility is afforded in being able to acquire parts which are presented on their sides or upside down relative to their desired orientation. The parts are brought into the desired orientation by adding a rotational capability to the gripping surfaces of the parallel jaw gripper where the axis of rotation of the part is parallel to the direction of jaw movement. Techno Sommer Automatic offers two Jaw parallel jaw grippers with this feature but, once again, the same problem of manually adjustable but nonprogrammable motion renders these pneumatic devices less than suitable for flexible assembly.

In U.S. Pat. No. 4,699,414 to Jones et al. a multi-use gripper is disclosed that lacks a direct connection between the D. C. motor shaft and the threaded lead screw which produces movement of the carriers and gripper finger. This shortcoming introduces errors in jaw movement, due to backlash and drive errors.

In U.S. Pat. No. 4,680,523 to Goumas et al, a gripper assembly is described that requires a stepper motor for each of the gripper fingers. This device has the obvious shortcoming of being prone to centering errors due to a loss of step count in one or both motors. Moreover, the gripping motion of the Goumas device is prone to finger alignment variability.

Therefore, a need persists for an apparatus and method having short stroke motion for gripping objects and capable of the following functions: acquiring, reorienting and releasing a wide range of part shapes and sizes; operating in confined spaces; automatically resizing its jaw opening to adapt to different size parts; controlling the gripping force exerted on the parts; and, reorienting overturned parts.

SUMMARY OF THE INVENTION

It is, therefore, an object of the present invention to provide a apparatus for grasping and releasing an object that utilizes programmable short stroke linear motions.

Still another object of the present invention to provide an apparatus that grasps and releases an object with controlled force.

Yet another object of the invention is an apparatus that can grasp and assemble a wide range of object or part sizes within minimum time constraints.

It is a feature of the present invention that drive means for the apparatus includes a programmable, miniature stepper motor that delivers short stroke motion to gripper jaw members that enable a wide range of linear movements of the jaw members.

To accomplish these and other objects, there is provided, in one aspect of the invention, an apparatus having short stroke motions for gripping objects which has a frame and a pair of cooperating jaw members for engaging and gripping an object arranged on the frame. In particular, the jaw members are supported on corresponding carriers which are supported in the frame. Each of the carriers have a threaded end portion. The carriers are arranged for linear or translational movement in the direction of web travel. Moreover, drive means operably associated with the jaw members are provided for actuating the jaw members to move for opening and closing about the object. Importantly, a drive means comprises a stepper motor having an output shaft with a first threaded end and a second, oppositely threaded end. In this embodiment, the first threaded end threadably connects with the threaded end portion of the carrier supporting one of the jaw members and the second, oppositely threaded end threadably connects with the threaded end portion of the carrier supporting the other jaw member.

In another aspect of the invention, a method of gripping an object with short stroke linear motion includes the steps of providing an object, such as miniature electronic components or mechanical components, and providing an apparatus having short stroke motions for grasping and releasing the object, as described above. The cooperating jaw members are then moved linearly into a position within reach of the object. The object is then engaged by the cooperating jaw members and then subsequently securely grasped by the jaw members.

Accordingly, it is an important advantageous effect of the present invention that an apparatus for grasping and releasing an object utilizing programmable means for controlling a wide range short stroke linear motions is useful for assembling objects or parts in very close proximity as well as objects or parts having disparate sizes and shapes for economical flexible automatic assembly.

BRIEF DESCRIPTION OF THE DRAWINGS

The above and other objects of the present invention will become apparent when taken in conjunction with the following description and drawings wherein identical reference numerals have been used, where possible, to designate identical elements that are common to the figures:

FIG. 3 is a front elevation view of the apparatus of the invention;

FIG. 4 is a front elevation view of the apparatus showing an alternate linear guide arrangement;

DETAILED DESCRIPTION OF THE INVENTION

Turning now to the drawings, and in particular to FIGS. 1(a) and 1(b)–5 broadly defined, apparatus 10 having short stroke linear motions for grasping an object 1, such as miniature electronic and mechanical components, includes a frame 58 and a pair of cooperating jaw members 14, 16 arranged on the frame 58 for engaging and grasping the object 1.

Figure 1A:
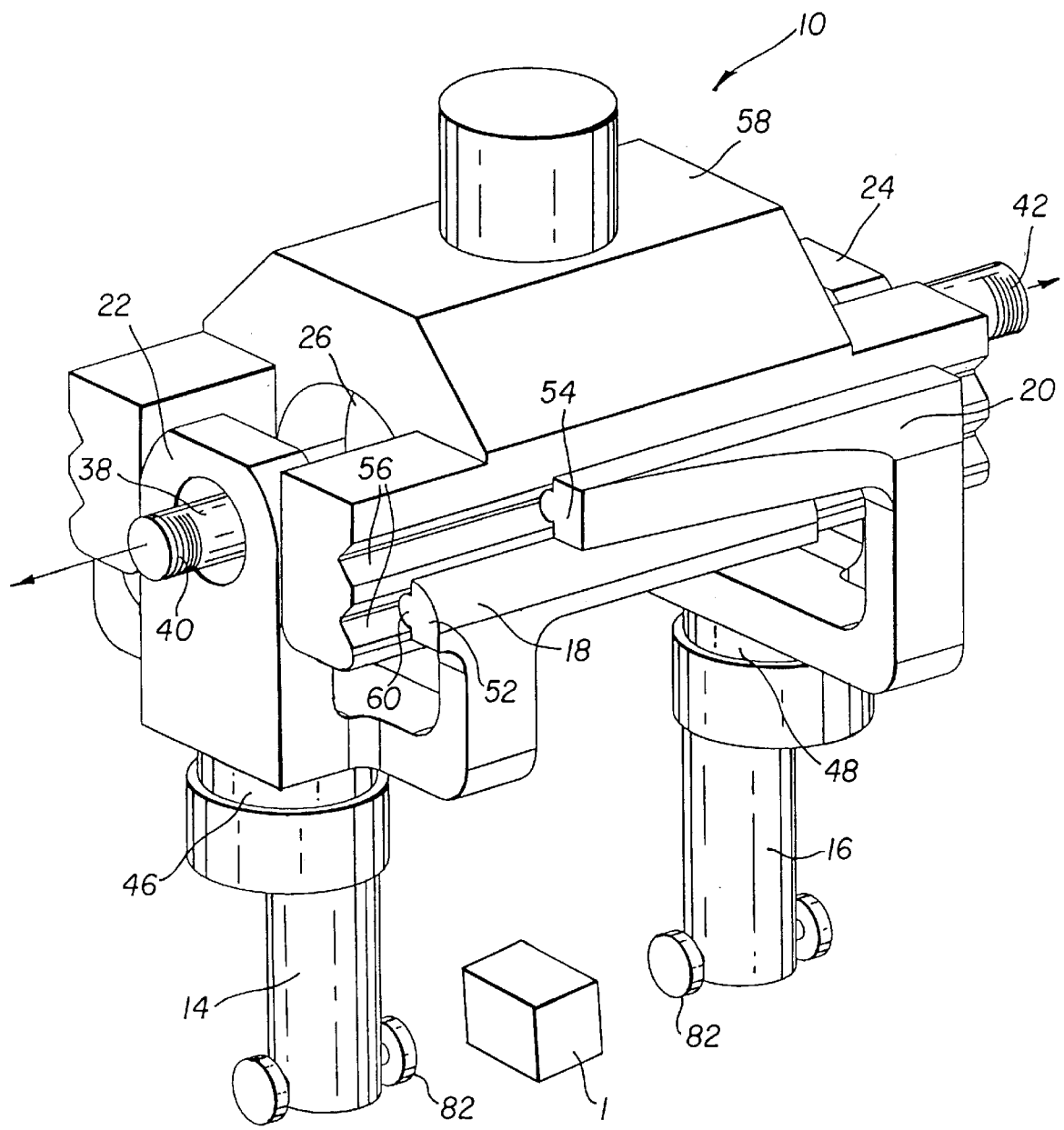
FIG. 1(a) is a perspective view of the apparatus of the invention.
Figure 1B:
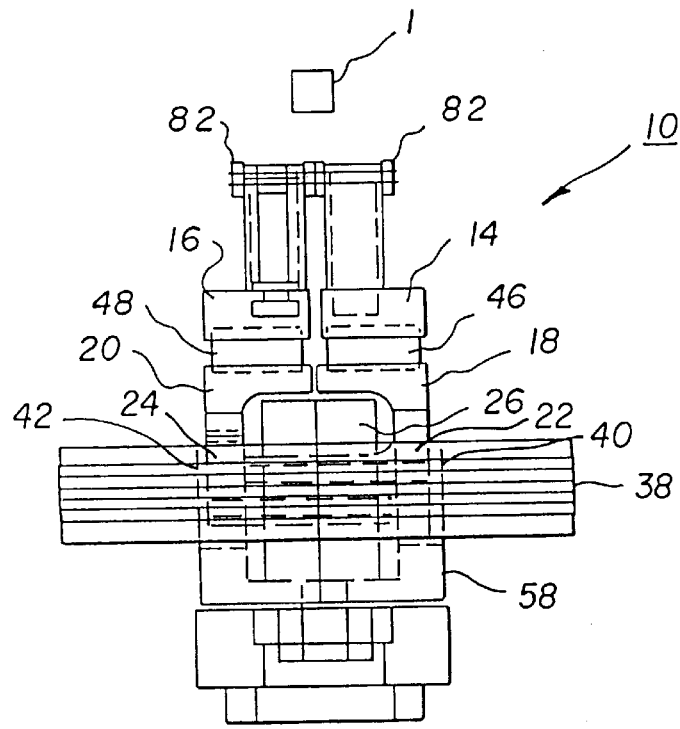
FIG. 1(b) is a side elevation view of the apparatus.

Referring to FIGS. 1(a) and 1(b), jaw members 14, 16 are supported on corresponding carriers 18, 20, respectively, which are supported in frame 58. Carriers 18, 20 each has a threaded end portion 22, 24, respectively, for cooperating with a drive means 26, described below. The carriers 18, 20 are arranged for linear or translational movement in the direction of web travel (noted by arrows in FIG. 1(a)). Drive means 26 (shown in FIGS. 1(a), 1(b), and 2–5) operably associated with the jaw members 14, 16 are provided for actuating the jaw members 14, 16 to move for opening and closing about the object 1. Importantly, drive means or alternately a stepper motor, 26 (described in more detail below), has an output shaft 38 with a first threaded end 40 and a second, oppositely threaded end 42. In this embodiment, the first threaded end 40 threadably connects with the threaded end portion 22 of the carrier 18 supporting one the jaw members 14 second oppositely threaded end 42 threadably connects with the threaded end portion 24 of the carrier 20 supporting the other jaw member 16.

Figure 2:
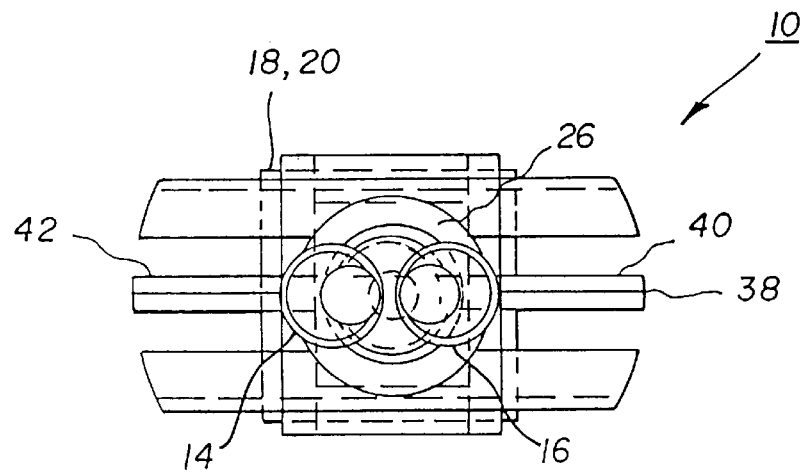
FIG. 2 is a top plan view of the apparatus.

Depicted in FIGS. 1(a), 1(b) and 2, linear displacement, parallel jaw gripper members 14, 16 are actuated by miniature stepper motor 26 having a double ended, threaded shaft 38. Perhaps best seen in FIG. 2, shaft 38 is fixedly connected to the rotor (not shown) of stepper motor 26. A left hand screw thread 40 (first threaded end of output shaft extends from one side of the motor 26 and engages threaded jaw carrier 18 on a first end while a right hand screw thread 42 (second threaded end of output shaft extends from the second side of the motor 26 and engages a threaded jaw carrier 18, 20 on the second side. According to FIGS. 1(a), 1(b), and 3–5, permanent magnets 46, 48 join jaw members 14, 16 to jaw carriers 18, 20, respectively. More particularly, jaw member 14 is magnetically mounted to carrier 18 by permanent magnet 46, and jaw member 16 is magnetically mounted to carrier 20 by permanent magnet 48. This provides distinct advantages over prior art gripper assemblies of the type disclosed, for instance, in U.S. Pat. Nos. 4,699,414 and 4,680,523 including: quick change gripper members 14, 16; and, overload protection is required in the event of a crash. Overload protection is required in the event that the gripper strikes a fixed object to protect both the gripper and the fixed object from permanent damage.

Referring again to FIG. 3, linear guideways 52, 54 guide the motion of the jaw carriers 18, 20 generally parallel to the axis of threaded shaft 38. Linear guideways 52, 54 may take the form of lengthwise extending grooves 56 in frame 58 which are engaged by ridges 60 in the jaw carriers 18, 20.

Figure 5:
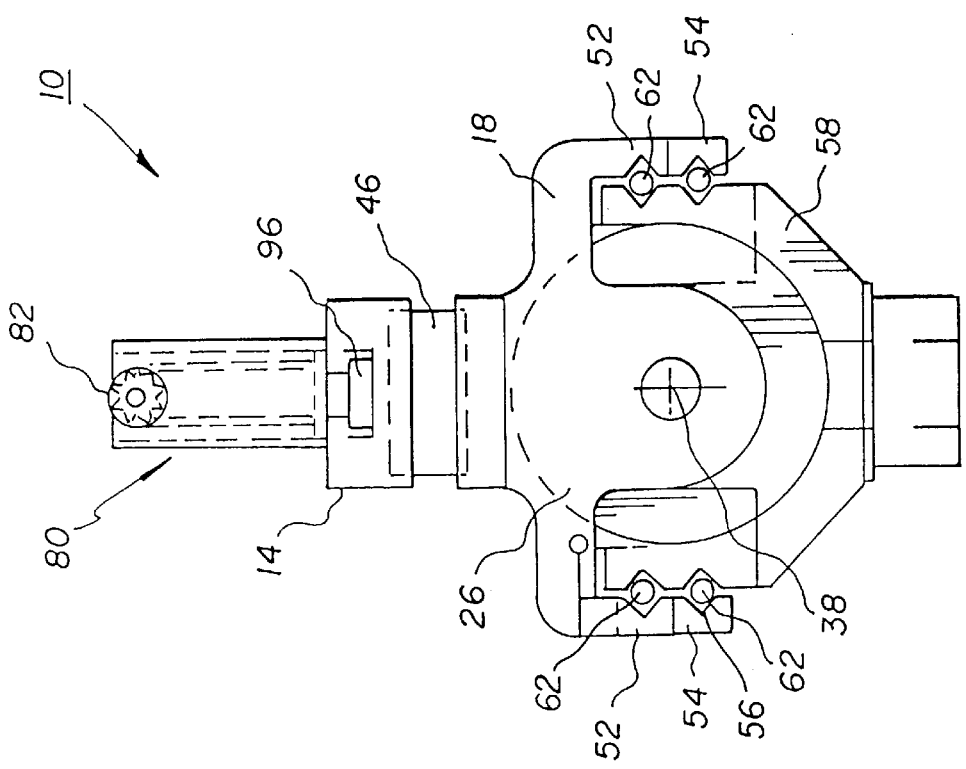
FIG. 5 is a front elevation view of the apparatus showing yet another alternate linear guide arrangement.

Illustrated in FIG. 4, alternately, the frame 58 may have ridges 60 which engage grooves 56 in jaw carriers 18, 20. In FIG. 5, rolling elements 62, preferably generally spherical steel balls, may also be used to support jaw carriers 18, 20 for linear translational movement relative to base member 58.

Referring to FIGS. 4 and 5, preferably apparatus 10 utilizes a miniature stepping motor 26 to deliver programmable, short stroke gripping and releasing linear movements of jaw members 14, 16 (not shown in FIGS. 4 and 5). It is our experience that the linear movements of jaw members 14, 16 fall anywhere within a wide range of possible movements of such jaw members 14, 16. Stepping motors 26 used in our preferred embodiment also provide a means for controlling the force which the jaw members 14, 16 exert on the object 1, also called the clamping force. This is achieved by either controlling current to the stepper motor 26 or by providing mechanical elasticity in the gripping jaw members 14, 16 in the direction of clamping force and controlling the position of the stepper motor 26. It is to be appreciated that the programmable motion gripper jaw members 14, 16 of the invention, as described above, enable the use of a single gripper device to acquire and assemble a wide range of part or object sizes without the interference and time constraints of currently available pneumatically actuated grippers. In this embodiment, high energy density permanent magnets (not shown) are used to attach the jaw members 14, 16 to the grippers. This embodiment provides the possibility for quick change jaw members 14, 16 and provides a measure of overload protection in the event of a crash. Overload protection is required when the gripper inadvertently strikes a fixed object. This feature prevents permanent damage to both the gripper and the fixed object.

Figure 7:
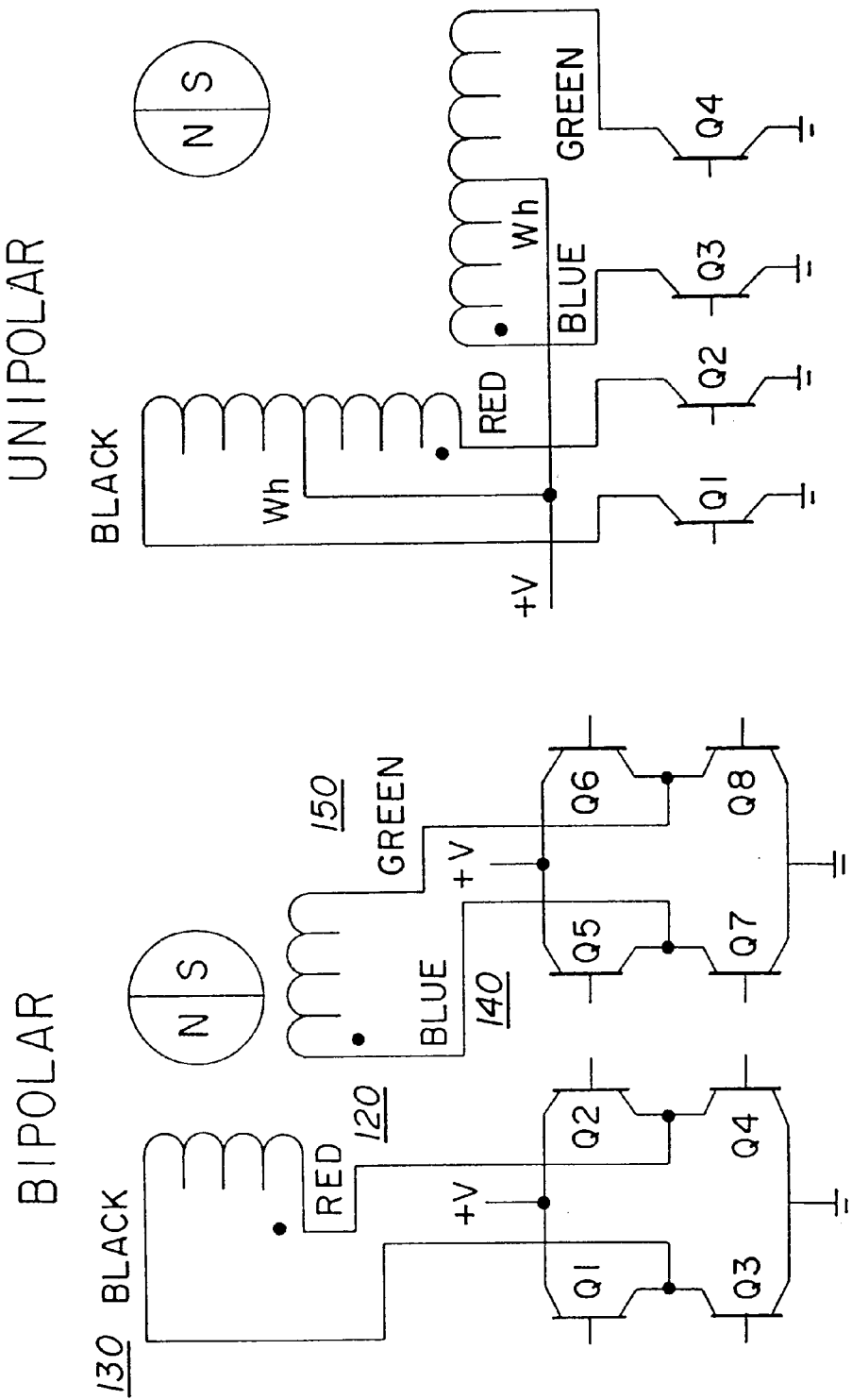

Turning now to FIG. 7, stepper motor 26 is driven according to a pulse train sequence which energizes various motor poles (not shown) to grasp or release an object 1. As an example, a typical pulse train sequence for clockwise rotation of the stepper motor is represented in Table 1 below from the *HSI Inc. Stepper Motor Catalog*.

| Bipolar | $Q_2$–$Q_3$ | $Q_1$–$Q_4$ | $Q_6$–$Q_7$ | $Q_5$–$Q_8$ |
|---------|-------|-------|-------|-------|
| Unipolar | $Q_1$ | $Q_2$ | $Q_3$ | $Q_4$ |
| Step |  |  |  |  |
| 1 | ON | OFF | ON | OFF |
| 2 | OFF | ON | ON | OFF |
| 3 | OFF | ON | OFF | ON |
| 4 | ON | OFF | OFF | ON |
| 1 | ON | OFF | ON | OFF |

Thus, according to the example depicted in Table 1, switching transistors $Q_1$–$Q_8$ are either conducting (on) or nonconducting (off). For the bipolar drive in state 1, switching transistors $Q_2$ and $Q_3$ are conducting which drives the current from lead 120 to lead 130, shown in FIG. 7. $Q_1$ and $Q_4$ are nonconducting. $Q_6$ and $Q_7$ are conducting and drive current from lead 150 to lead 140 (FIG. 7). $Q_5$ and $Q_8$ are nonconducting. Hence, by changing the polarity of the motor stator coils (not shown) by changing the current flow direction through the stator coils and thus their polarity, the magnetic field in the stator coils processes in a clockwise or counterclockwise direction. Moreover, the permanent magnet rotor of stepper motor 26 follows the precessing magnetic field of the stator coils by virtue of magnetic attraction.

Figure 6:
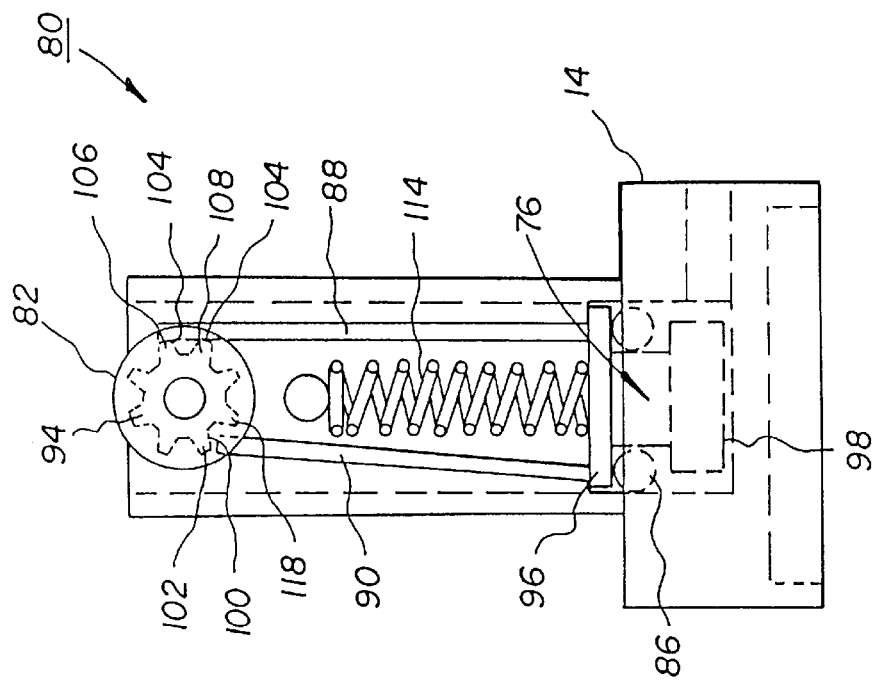
FIG. 6 is a front elevation view of a ratchet mechanism useful for orienting a grasped object; and, FIG. 7 is typical motor pole actuation sequence for driving a stepper motor used in conjunction with the invention.

Vacuum cups (not shown) could be fitted to the extremities of each of the jaw members 14, 16 to acquire objects 1 through the use of vacuum as described previously. Alternately, as shown in FIG. 6, a pneumatic actuator assembly 76 located in one or both of the jaw members 14, 16 may operate a detented ratchet mechanism 80 to programmably index a rotational pad 82 in increments of 15, 30 or 45 degrees. Pneumatic assembly 76 includes piston rod 96, seal 86 and jaw member 14. Further illustrated in FIG. 6, ratchet mechanism 80, advantageously, allows the gripped object 1 to be rotated about an axis parallel to the direction of clamping motion of jaw members 14, 16.

In FIG. 6, ratchet mechanism 80 comprises a forked piston rod 96 having a seal 86 on one end and two spring flexure blades 88, 90 on the other. The longer flexure 88 acts as a rotational detent as it bears against the tips 104 of teeth 102 on pinion 94. The shorter blade 90 bears against a face 100 of one of the teeth 102 when the piston rod 96 is in the retracted position. As air pressure is applied to the upper end 98 of piston rod 96, the rod 96 is displaced toward pinion 94. Flexure blade 90 contacts the face 100 of tooth 102 and causes pinion 94 to rotate clockwise, overcoming the detent force of flexure blade 88 bearing against the tips 104 of pinion teeth 106, 108. As the pinion 94 rotates, flexure blade 90 loses engagement with tooth 102 and acts as a second detent device, in combination with flexure blade 88 to prevent rotation of pad 82. Spring 114 retracts piston rod 96 to its original position and allows flexure blade 90 to engage tooth 118.

Skilled artisans will appreciate that a miniature stepper motor 26 acting through a belt drive (not shown) could alternately be used to index the pad 82 in very small increments but with a somewhat reduced torque capability.

It is further to be appreciated that stepper motor drive 26 may be purposely overdriven to grasp an object 1 and then commanded to release the object 1 with a smaller motion index. The motion in this case will adapt to slightly different nominal object dimensions by losing command counts while grasping but will open to repeatable nominal opening dimension without cumulative error so long as the commanded grasping displacement is greater than both the minimum displacement required to grasp the object 1 and the commanded displacement to release the object 1.

In yet another embodiment of the invention, a method of gripping an object 1 with short stroke linear motion includes the steps of providing an object, such as miniature electronic and mechanical components, and providing an apparatus 10 for grasping and releasing the object 1, as described above. The cooperating jaw members 14, 16 are then moved into a position within reach of the object 1. The object 1 is then engaged by the cooperating jaw members 14, 16 and then subsequently securely grasped. After the object 1 is grasped securely by the jaw members 14, 16, the object 1 may be maneuvered from a first position at which the object 1 was securely grasped, to a second position at which the object 1 is subjected to independent treatment, such as assembly. After independent treatment, the object 1 may then be released from the jaw members 14, 16.

The invention has been described in detail with particular reference to certain preferred embodiments thereof, but it will be understood that variations and modifications can be effected within the spirit and scope of the invention.

PARTS LIST

1 . . . object
10 . . . apparatus
14, 16 . . . jaw members
18, 20 . . . carriers
22, 24 . . . threaded portion
26 . . . drive means
30 . . . first threaded end of output shaft
38 . . . output shaft
42 . . . second threaded end of output shaft
46 . . . permanent magnet
48 . . . permanent magnet
52 . . . linear guideways
54 . . . linear guideways
56 . . . extending grooves
58 . . . frame
60 . . . ridges
62 . . . rolling elements
76 . . . pneumatic actuator assembly
80 . . . ratchet mechanism
82 . . . rotational pad
86 . . . seal
88,90 . . . spring flexure blades
90 . . . blade
94 . . . pinion
96 . . . piston rod
98 . . . upper end
100 . . . face
102 . . . tooth
104 . . . tips
106, 108 . . . pinion teeth
114 . . . spring 118 ... tooth
120 ... lead
130 ... lead
140 ... lead
150 ... lead

What is claimed is:

1. An apparatus having short range motion for gripping and releasing an object, said apparatus comprising:
   a frame;
   a pair of cooperating jaw members for engaging and gripping an object, said jaw members being supported on corresponding carriers, each of said corresponding carriers having a threaded end portion, said carriers being mounted for translational movement in said frame;
   drive means operably associated with said jaw members for actuating said jaw members to move for opening and closing about said object, said drive means comprising a stepper motor having an output shaft having a first threaded end and a second, oppositely threaded end, wherein said first threaded end threadably connects with the threaded end portion of said carrier supporting one said jaw member and said second, oppositely threaded end threadably connects with the threaded end portion of the carrier supporting said other jaw member.

2. The apparatus recited in claim 1, wherein each of said jaw members is mounted to said carrier by a permanent magnet arranged between said jaw member and said carrier.

3. The apparatus recited in claim 1, wherein a linear guide is associated with said carrier for guiding the movement of said jaw members.

4. The apparatus recited in claim 3, wherein said linear guide comprises elongated grooves formed in said frame.

5. The apparatus recited in claim 3, wherein said linear guide comprises elongated grooves formed in said carrier.

6. The apparatus recited in claims 4 or 5, wherein a plurality of rolling elements are arranged in said grooves for facilitating translational movement of said carriers relative to said frame.

7. The apparatus recited in claim 1, wherein a vacuum cup is arranged on an end portion of each of said jaw members, said vacuum cups being supplied with vacuum from a vacuum generating means.

8. The apparatus recited in claim 1, wherein said stepper motor is programmably adapted for driving the jaw members to reposition for accommodating larger and smaller objects, and wherein said stepper motor is programmably adapted for being selectively overdriven to grip and release an object within a short motion range.

9. The apparatus recited in claim 1, wherein at least one of said jaw members is responsive to a pneumatic actuator operably associated with said jaw member.

10. Method of gripping an object with short stroke motion, comprising the steps of:
    providing an object;
    providing a short stroke motion apparatus for gripping and releasing said object, said apparatus comprising a frame; a pair of cooperating jaw members for engaging and gripping an object, said jaw members being supported on corresponding carriers, each of said corresponding carriers having a threaded end portion, said carriers being mounted for translational movement in said frame; drive means operably associated with said jaw members for actuating said jaw members to move for opening and closing about said object, said drive means comprising a stepper motor having an output shaft having a first threaded end and a second, oppositely threaded end, wherein said first threaded end threadably connects with the threaded end portion of said carrier supporting one said jaw member and said second, oppositely threaded end threadably connects with the threaded end portion of the carrier supporting said other jaw member;
    moving said cooperating jaw members within reach of said object;
    engaging said object with said cooperating jaw members; and,
    securely grasping said object with said cooperating jaw members.

11. The method recited in claim 10, further comprising the step of maneuvering said object from a first position at which said object was securely gripped to a second position at which said object is subjected to independent treatment, and then releasing said object from said cooperating jaw members.

* * * * *